(12) United States Patent
Brautsch et al.

(10) Patent No.: US 7,497,668 B2
(45) Date of Patent: Mar. 3, 2009

(54) GAS SUPPLY ARRANGEMENT AND ASSOCIATED METHOD, PARTICULARLY FOR A GAS TURBINE

(75) Inventors: Andreas Brautsch, Wuerenlingen (CH); George Mitsis, Baden-Daettwil (CH); Patrick Queloz, Basel (CH); Floris Van Straaten, Wettswil (CH)

(73) Assignee: Alstom Technology Limited, Baden (CH)

( * ) Notice: Subject to any disclaimer, the term of this patent is extended or adjusted under 35 U.S.C. 154(b) by 361 days.

(21) Appl. No.: 11/222,422

(22) Filed: Sep. 8, 2005

(65) Prior Publication Data
US 2007/0012358 A1      Jan. 18, 2007

(30) Foreign Application Priority Data
Sep. 9, 2004      (CH) .................................... 1486/04

(51) Int. Cl.
*F04B 49/00*      (2006.01)
(52) U.S. Cl. ........................... 417/278; 417/14; 60/409; 60/39.281
(58) Field of Classification Search .................... 417/53, 417/57, 58, 137, 295, 44.2, 26, 28, 14, 278; 60/39.281, 409
See application file for complete search history.

(56) References Cited

U.S. PATENT DOCUMENTS

| | | | | |
|---|---|---|---|---|
| 3,716,305 | A | * | 2/1973 | Oberlander ..................... 417/2 |
| 4,273,508 | A | * | 6/1981 | Fomichev et al. .............. 415/1 |
| 4,922,710 | A | * | 5/1990 | Rowen et al. ............ 60/39.281 |
| 5,606,858 | A | * | 3/1997 | Amir et al. ..................... 60/648 |
| 6,293,766 | B1 | | 9/2001 | Blotenberg ................. 417/300 |
| 6,551,068 | B2 | | 4/2003 | Blotenberg .................. 417/53 |
| 2004/0045275 | A1 | * | 3/2004 | Tanaka .................... 60/39.281 |

FOREIGN PATENT DOCUMENTS

| | | |
|---|---|---|
| DE | 100 12 380 | 9/2001 |
| EP | 0 661 426 | 7/1995 |
| EP | 1 016 787 | 7/2000 |

* cited by examiner

*Primary Examiner*—Devon C Kramer
*Assistant Examiner*—Dnyanesh Kasture
(74) *Attorney, Agent, or Firm*—Darby & Darby

(57) ABSTRACT

A method for operating a gas-supply system, particularly for a gas turbine, having a gas-carrying pipeline, a controllable compressor arranged in the pipeline and at least one consumer connected to the pipeline and located downstream from the compressor. The compressor is regulated as a function of a comparison between the setpoint discharge pressure of the compressor and the actual discharge pressure of the compressor. The energy consumption of the compressor can be reduced in that the setpoint discharge pressure of the compressor is determined as a function of a setpoint admission pressure of the consumer.

18 Claims, 1 Drawing Sheet

GAS SUPPLY ARRANGEMENT AND ASSOCIATED METHOD, PARTICULARLY FOR A GAS TURBINE

The present invention relates to a method for operating a gas-supply system, particularly for a gas turbine. The present invention also relates to a gas-supply system, especially for a gas turbine.

BACKGROUND

European patent application EP 1 016 787 A2 discloses a gas-supply system as well as an appertaining operating method of the above-mentioned type. This prior-art gas-supply system comprises a gas-carrying pipeline, a controllable compressor arranged in the pipeline and a consumer namely, a gas turbine. connected to the pipeline and located downstream from the compressor. In order to actuate the compressor, a control unit in the form of a regulator is provided that regulates the compressor as a function of a setpoint/actual-value comparison of the discharge pressure of the compressor. For regulation purposes, the regulator can change the rotational speed and/or the guide vane setting of the compressor. The actual discharge pressure of the compressor can be measured in a conventional manner at the compressor outlet. In contrast to this, normally speaking, the set point discharge pressure of the compressor is permanently preset, whereby this preset value depends on the location of the gas turbine, particularly on the lowest ambient temperatures that can be expected. Furthermore, the predetermined setpoint discharge pressure of the compressor is derived from the maximum output of the gas turbine as well as from the maximum gas temperature and from the lower caloritic value of the gas.

Moreover, in the prior-art gas-supply system, a throttle element is installed in the pipeline upstream from the compressor, said throttle element being actuated by means of a separate regulator. When the pressure in the pipeline changes, the throttle element can be employed to continuously regulate the desired admission pressure for the compressor that allows the compressor to adjust the discharge setpoint pressure of the compressor. In this manner, the compressor can be continuously operated at a high output, particularly at its rated output. This, however, is not always sensible for energy reasons.

Here, in particular, compressors having a fixed compression ratio are frequently employed. If the pressure in the pipeline increases, the discharge pressure can reach impermissibly high values if the admission pressure is not appropriately adjusted down by means of the throttle element located upstream. Such a compressor operates continuously at full load or at the rated load.

SUMMARY OF THE INVENTION

An object of the present invention is to provide an improved embodiment or an improved operating method for a gas-supply system, which especially results in less energy consumption on the part of the compressor.

The present invention is based on the general idea of regulating the compressor as a function of the admission pressure of the consumer. As a result, the compressor can be operated directly as a function of the momentary demand, which makes it possible to correspondingly reduce the output of the compressor when the pressure demand is less. In this manner, the energy consumption of the compressor can be lowered. Therefore, the invention establishes a feedback of the momentary energy requirement of the gas turbine to the upstream gas-supply system.

In an especially advantageous embodiment, the requisite consumer admission pressure can be ascertained as a function of at least one momentary consumer parameter, for example, its load state, as well as of at least one momentary ambient parameter, for instance, the ambient temperature. This way, the necessary setpoint admission pressure of the consumer, at least for one rated operating state of the consumer, can be ascertained independently of the consumer or independently of the active feedback from the consumer. Consequently, the gas-supply system can function autonomously.

A particularly significant embodiment is one in which a pressure reducer is located upstream from the compressor. In the case of the invention, this pressure reducer is only needed if the pipeline pressure, in other words, the compressor admission pressure measured upstream from the pressure reducer, is higher than the ascertained setpoint discharge pressure of the compressor. In this case, the pressure reducer serves to throttle the excess pressure in the pipeline down to the requisite setpoint discharge pressure of the compressor. At the same time, the compressor is deactivated, so that it does not consume any energy. In contrast to this, if the pipeline pressures are lower, the pressure reducer is deactivated and the requisite pressure increase is brought about by means of the compressor.

In order to deactivate the pressure reducer and to deactivate the compressor, appropriate bypasses can be provided that can be configured internally, that is to say, inside the pressure reducer or inside the compressor, or else externally, that is to say, through separate bypass lines that run especially outside of the compressor or of the pressure reducer.

Additional important features and advantages of the present invention can be gleaned from the subordinate claims, from the drawing and from the description of the drawing presented below.

BRIEF DESCRIPTION OF THE DRAWINGS

The drawing below shows a special embodiment that should not be construed as a restriction of the general principle and that will be elaborated upon in greater detail below.

The single

DETAILED DESCRIPTION

Figure 1:
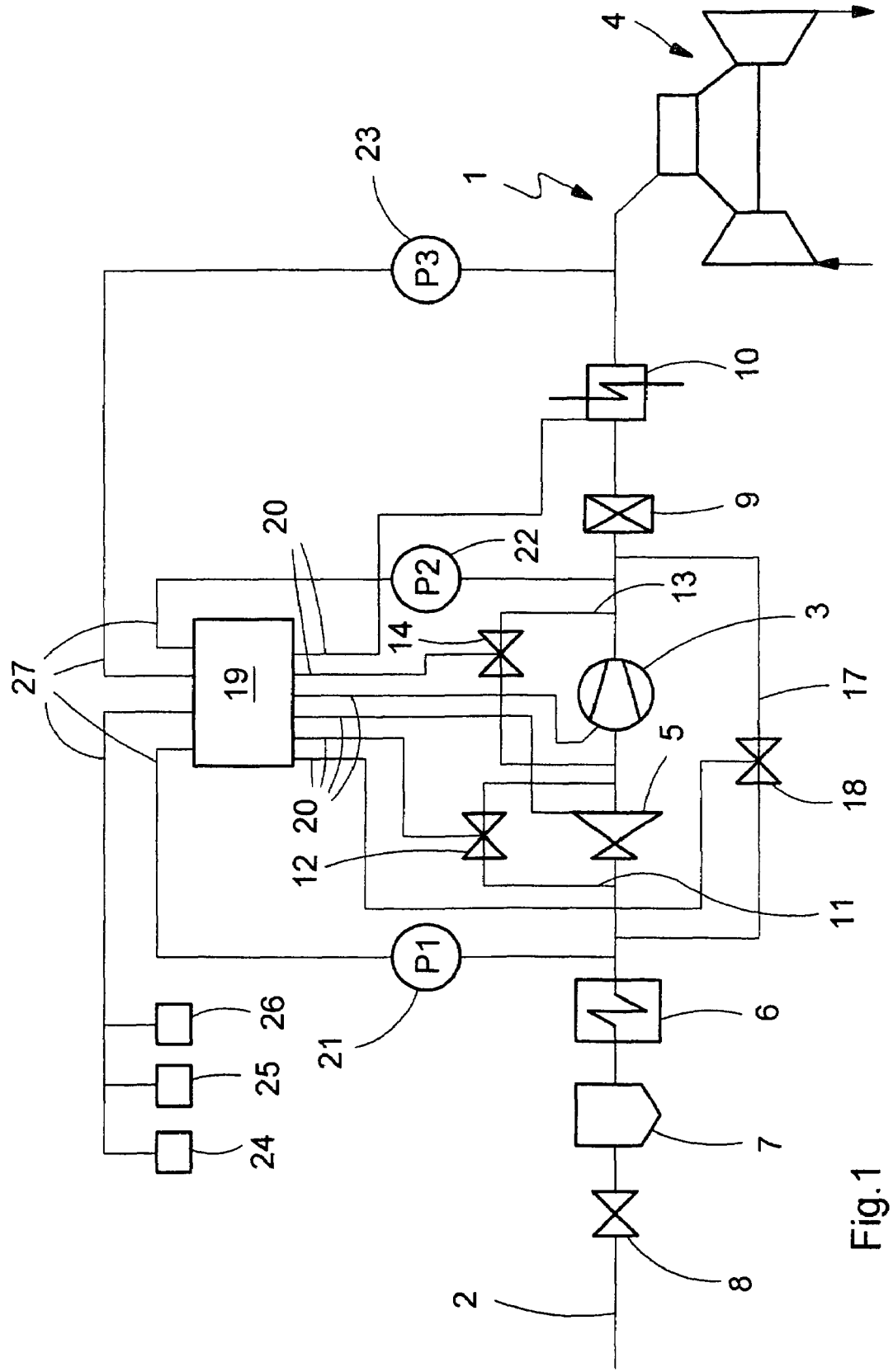
FIG. 1 is a greatly simplified, schematic circuit diagram of a gas-supply system according to the invention.

According to FIG. 1, a gas-supply system 1 comprises a pipeline 2 in which a compressor 3 is arranged and which is connected to a consumer 4. Here, the consumer 4 is located downstream from the compressor 3. For example, the consumer 4 is a gas turbine, especially for generating electricity in a power plant.

In the pipeline 2, upstream from the compressor 3, there is a pressure reducer 5 that can systematically lower the pressure of the gas flowing through the pressure reducer 5. Upstream from the pressure reducer 5, there is a dew-point heater 6 by means of which, in the case of low ambient temperatures, the gas can be heated up to above the dew point of any liquid that might have been entrained. Upstream from this dew-point heater 6, there is a separator 7 for separating out particles and/or droplets that are entrained by the gas flow. Here, upstream from the separator 7, there is also a non-return valve 8 by means of which the gas supply can be completely shut off, for example, in an emergency.

Downstream from the compressor 3, there is a fine filter 9 for filtering small or fine-grained liquid or solid impurities out of the gas flow. Downstream from this fine filter 9, there is a pre-heater 10 by means of which the gas flow can be heated up to a specified temperature as needed.

Although in the embodiment shown here, each of the cited components, that is to say, at least the compressor 3, the pressure reducer 5, the dew-point heater 6, the separator 7, the fine filter 9 and the pre-heater 10 only appear once, it is common practice, at least in power plant construction, for such components that are important for the gas supply to the gas turbine 4 to be present in duplicate, in other words, to be configured redundantly. These redundant components are advantageously connected in parallel to each other in each case.

The embodiment shown here also comprises a first bypass 11 that serves to bypass the pressure reducer 5 or to bring about a low-resistance flow through it. The first bypass 11 can be configured internally, that is to say, inside the pressure reducer 5. As an alternative, the first bypass 11—as shown here—can be formed by a separate bypass line. Furthermore, the first bypass 11 is controllable, which is indicated here by means of a first control valve 12. In the case of an internal bypass 11, this first control valve 12 can be fundamentally dispensed with, since its function can be realized by a control unit or by control elements of the pressure reducer 5.

Moreover, a second bypass 13 is provided which serves to bypass the compressor 3 or to bring about a low-resistance flow through it and which is likewise controllable. The second bypass 13 can likewise be configured internally, in other words, integrated into the compressor 3, or else externally by means of a separate bypass line. The second bypass 13 is likewise controllable directly or indirectly via the compressor 3, which is indicated here by means of a second control valve 14.

In addition, a third bypass 17 is also provided here which bypasses the pressure reducer 5 as well as the compressor 3 externally, that is to say, it is realized with a separate bypass line and can be controlled by means of a third control valve 18. Fundamentally speaking, this third bypass 17 can also be realized internally.

The gas-supply system 1 according to the invention is also equipped with a control unit 19 that employs several control lines 20 to control the controllable or adjustable components of the gas-supply system 1, i.e. in this case, the compressor 3, the pressure reducer 5, the pre-heater 10 and the three bypasses 11, 13, 17 or their control valves 12, 14, 18.

Furthermore, the gas-supply system 1 has several sensors, namely, a first pressure sensor 21 for ascertaining the actual admission pressure of the compressor $p_{1ACTUAL}$, a second pressure sensor 22 for ascertaining the actual discharge pressure of the compressor $p_{2ACTUAL}$, a third pressure sensor 23 for ascertaining the actual admission pressure of the consumer $p_{3ACTUAL}$ as well as other sensors 24, 25, 26 for ascertaining at least one ambient parameter such as, for instance, the ambient temperature, ambient pressure and humidity. The above-mentioned sensors 21 to 26 are connected to the control unit 19 via appropriate signal lines 27. In this manner, the control unit 19 can take into consideration the values detected by the sensors 21 to 26 in order to control or regulate the components connected thereto.

In the embodiment according to FIG. 1, the pressure reducer 5 is configured as a part that is separate from the compressor 3. Preference, however, is given to an embodiment in which the pressure reducer 5 is physically or functionally integrated into the compressor 3. Such a functional integration can be achieved particularly easily with a controllable compressor 3, for example, by means of adjustable guide vanes, for instance, at the inlet of the compressor 3. Of course, only the third bypass 17 is fundamentally necessary with such an embodiment.

The gas-supply system 1 according to the invention functions as follows:

The gas pressure in the pipeline 2 is subject to fluctuations resulting from the momentary gas feed as well as from the momentary ambient conditions. So that the consumer 4, preferably a gas turbine, can be operated at the highest level of efficiency possible, it is necessary to implement an operating state for the consumer 4 that is as constant as possible, in other words, stationary. In order to achieve this, the fluctuations in the pipeline 2 have to be compensated for. In the invention, this is done primarily by means of an appropriate actuation of the compressor 3 which, for this purpose, is configured such that it can be controlled or regulated. In this context, the output of the compressor 3 is controlled or regulated. For instance, the rotational speed of the compressor can be varied in order to achieve this. By the same token, the guide vanes of the compressor 3 can be correspondingly adjusted. The objective here is to only rarely operate the compressor 3 at its maximum output. The maximum output of the compressor 3 is dimensioned for the worse-case scenario of ambient conditions and gas demand or gas pressure demand on the part of the consumer 4. Such bad scenarios, however, only occur relatively seldom during the service life of the consumer 4. As a result of the inventive regulated operation of the compressor 3, continuous operation at the full load of the compressor 3 is eliminated, which is the rule for conventional gas-supply systems 1. In such conventional gas-supply systems 1, pressure fluctuations in the pipeline 2 are caused by throttling that occurs upstream from the compressor 3. In such cases, energy is wasted, which lowers the overall efficiency of the power plant.

With the gas-supply system 1 according to the invention, a distinction is generally made between two different operating states: on the one hand, the operation of the gas-supply system 1 at an actual admission pressure of the compressor $p_{1ACTUAL}$ that is lower than a required setpoint discharge pressure of the compressor $p_{2SETPOINT}$, in other words, $p_{1ACTUAL} < p_{2SETPOINT}$, and on the other hand, an operation at an actual admission pressure of the compressor $p_{1ACTUAL}$ that is higher than the desired setpoint discharge pressure of the compressor $p_{2SETPOINT}$, in other words, $p_{1ACTUAL} > p_{2SETPOINT}$. Naturally, the state in which the actual admission pressure of the compressor $p_{1ACTUAL}$ is the same as the desired setpoint discharge pressure of the compressor $p_{2SETPOINT}$ ($p_{1ACTUAL} = p_{2SETPOINT}$) can be advantageously associated with one or the other of the two operating states described above or else to yet another operating state.

A special feature here is that the admission pressure of the compressor $p_1$ is measured upstream from the pressure reducer 5 associated with the compressor 3, that is to say, not directly at the compressor inlet.

The control unit 19 now regulates the compressor 3 as a function of a setpoint/actual-value comparison for the discharge pressure of the compressor $p_2$. According to the invention, the setpoint discharge pressure of the compressor $p_{2SETPOINT}$ is determined as a function of the setpoint admission pressure of the consumer $p_{3SETPOINT}$. This setpoint admission pressure of the consumer $p_{3SETPOINT}$ can be fed to the control unit 19, for example, by means of a control circuit (not shown here) of the consumer 4. However, preference is given to an embodiment in which the gas-supply system 1 determines the setpoint admission pressure of the consumer $p_{3SETPOINT}$ essentially autonomously. Preferably, the setpoint admission pressure of the consumer $p_{3SETPOINT}$ is determined as a function of at least one consumer parameter such as, for example, the momentary output requirement of the consumer as well as at least one ambient parameter, for instance, the ambient temperature and/or the ambient pressure and/or the ambient humidity. By means of appropriate computation methods, the control unit 19 can ascertain the requisite setpoint admission pressure of the consumer $p_{3SETPOINT}$ on the basis of the at least one ambient parameter and of the at least one consumer parameter, whereby said setpoint admission pressure of the consumer $p_{3SETPOINT}$ has to be present so that the consumer 4 can reach a specified operating state, advantageously the rated operating state.

Since in the present case, additional components, namely, the fine filter 9 and the pre-heater 10, are arranged in the pipeline 2 between the consumer 4 and the compressor 3, a pressure drop inevitably occurs between the compressor 3 and the consumer 4, whereby said pressure drop can be determined and can thus be taken into account in the computation of the setpoint discharge pressure of the compressor $p_{2SETPOINT}$. Accordingly, the setpoint discharge pressure of the compressor $p_{2SETPOINT}$ is also determined as a function of the pressure drop that occurs between the compressor outlet and the consumer inlet during operation of the gas-supply system 1.

For the eventuality that the actual admission pressure of the compressor $p_{1ACTUAL}$ is lower than the setpoint discharge pressure of the compressor $p_{2SETPOINT}$, the control unit 19 activates the first bypass 11 and the compressor 3. The pressure reducer 5, the second bypass 13 and the pre-heater 10 are then deactivated. This means that, if the pressure in the pipeline 2 is lower than the setpoint discharge pressure of the compressor $p_{2SETPOINT}$, essentially no throttling occurs upstream from the compressor 3. By the same token, throttling downstream from the compressor 3 extending to the consumer 4 is avoided to the greatest extent possible so as to altogether minimize the energy consumption of the compressor 3.

In another embodiment, with which the compressor 3 can be actuated in a variable manner, the external first bypass 11 and/or the external second bypass 13 can be dispensed with; by the same token, the pressure reducer 5 can be fundamentally dispensed with. Particularly with such an embodiment, the third bypass 17 can be sufficient.

In the eventuality that the actual admission pressure of the compressor $p_{1ACTUAL}$ is higher than the setpoint discharge pressure of the compressor $p_{2SETPOINT}$, the control unit 19 actuates the components of the gas-supply system 1 in such a way that now the first bypass 11 is deactivated, the pressure reducer 5 is activated, the compressor 3 is deactivated, the second bypass 13 is activated and, if applicable, the pre-heater 10 is activated. In this operating state, it is possible to completely dispense with the operation of the compressor 3, so that the latter does not consume energy.

Therefore, all in all, the gas-supply system 1 according to the invention accounts for less energy consumption, which is beneficial for the overall efficiency of the power plant.

The third bypass 17 can also be activated for special operating states, for example, if the actual admission pressure of the compressor $p_{1ACTUAL}$ is the same as the setpoint discharge pressure of the compressor $p_{2SETPOINT}$. This "special operating state" should actually constitute the desired ideal or rated state since then, neither throttling nor compression of the gas is required.

The invention claimed is:

1. A method for operating a gas-supply system having a gas-carrying pipeline, a controllable compressor arranged in the pipeline, a pressure reducer disposed in the pipeline upstream of the compressor or at least partially integrated into the compressor, and at least one consumer connected to the pipeline and located downstream from the compressor, the method comprising:
   determining a momentary setpoint admission pressure of the consumer as a function of at least one momentary ambient parameter;
      determining a setpoint discharge pressure of the compressor as a function of the momentary setpoint admission pressure of the consumer;
   regulating the compressor as a function of a comparison between the setpoint discharge pressure of the compressor and an actual discharge pressure of the compressor; and
   regulating the pressure reducer as a function of the difference between the admission pressure of the compressor and the setpoint discharge pressure of the compressor.

2. The method as recited in claim 1, further comprising determining the setpoint admission pressure of the consumer as a function of at least one consumer parameter and the at least one ambient parameter.

3. The method as recited in claim 1, wherein the determining of the setpoint discharge pressure of the compressor is performed also as a function of a pressure drop in the pipeline between an outlet of the compressor and an inlet of the consumer.

4. The method as recited in claim 1, wherein the regulating of the compressor is performed by regulating an output of the compressor.

5. The method as recited in claim 1, wherein the regulating of the pressure reducer includes:
   measuring an actual admission pressure of the compressor upstream from the pressure reducer;
   switching off the pressure reducer and switching on the compressor if the actual admission pressure of the compressor is lower than the setpoint discharge pressure of the compressor; and
   switching on the pressure reducer and switching off the compressor if the actual admission pressure of the compressor is higher than the setpoint discharge pressure of the compressor.

6. The method as recited in claim 5, wherein the gas supply system includes a controllable bypass for bypassing the compressor and the pressure reducer, the controllable bypass being one of an internal and an external bypass, and wherein the method further comprises flowing the gas through the controllable bypass if the actual admission pressure of the compressor is the same as the setpoint discharge pressure of the compressor.

7. The method as recited in claim 5, wherein the gas supply system includes a pre-heater disposed in the pipeline downstream from the compressor and upstream from the consumer, and wherein the method further comprises:
   switching on the pre-heater if the actual admission pressure of the compressor is higher than the setpoint discharge pressure of the compressor; and
   switching off the pre-heater if the actual admission pressure of the compressor is lower than the setpoint discharge pressure of the compressor.

8. The method as recited in claim 1, wherein the consumer is a gas turbine.

9. A gas-supply system comprising:
   a gas-carrying pipeline;
   a control unit;
   a compressor disposed in the pipeline; and
   at least one consumer disposed downstream from the compressor;

a pressure reducer disposed in the pipeline upstream of the compressor or at least partially integrated into the compressor, the control unit configured to determine a momentary setpoint admission pressure of the consumer as a function of at least one momentary ambient parameter, to determine a setpoint discharge pressure of the compressor as a function of the momentary setpoint admission pressure of the consumer, to regulate the compressor as a function of a comparison between the setpoint discharge pressure of the compressor and an actual discharge pressure of the compressor, and to regulate the pressure reducer as a function of the difference between the admission pressure of the compressor and the setpoint discharge pressure of the compressor.

10. The gas-supply system as recited in claim 9, wherein the control unit is configured to determine the setpoint discharge pressure of the compressor also as a function of the pressure drop in the pipeline between an outlet of the compressor and an inlet of the consumer.

11. The gas-supply system as recited in claim 9, wherein the control unit is configured to determine the setpoint admission pressure of the compressor as a function of at least one consumer parameter and the at least one ambient parameter.

12. The gas-supply system as recited in claim 9, wherein the control unit regulates an output of the compressor.

13. The gas-supply system as recited in claim 9 wherein the controllable pressure reducer is disposed in the pipeline upstream from the compressor.

14. The gas-supply system as recited in claim 9, wherein a pressure reducing function of the controllable pressure reducer is integrated into the compressor.

15. The gas-supply system as recited in claim 9, wherein the actual admission pressure of the compressor is measured upstream from the pressure reducer, and wherein the control unit is configured to:

switch off the pressure reducer and switch on and regulate the compressor, if the actual admission pressure of the compressor is lower than the setpoint discharge pressure of the compressor; and switch on and regulate the pressure reducer and switch off the compressor, if the actual admission pressure of the compressor is higher than the setpoint discharge pressure of the compressor.

16. The gas-supply system as recited in claim 15, further comprising a controllable bypass for bypassing the compressor and the pressure reducer, the bypass being one of an internal bypass and an external bypass, and wherein the control unit is configured to feed the gas through the controllable bypass if the actual admission pressure of the compressor is the same as the setpoint discharge pressure of the compressor.

17. The gas-supply system as recited in claim 15, further comprising a controllable pre-heater disposed in the pipeline downstream from the compressor and upstream from the consumer, wherein the control unit is configured to:

switch on and regulate the pre-heater if the actual admission pressure of the compressor is higher than the setpoint discharge pressure of the compressor, and switch off the pre-heater if the actual admission pressure of the compressor is lower than the setpoint discharge pressure of the compressor.

18. The gas-supply system as recited in claim 9, wherein the consumer is a gas turbine.

* * * * *